(12) United States Patent
Yebka et al.

(10) Patent No.: US 6,680,043 B2
(45) Date of Patent: Jan. 20, 2004

(54) PROCESS FOR ENHANCING THE KINETICS OF HYDROGENATION/ DEHYDROGENATION OF MAIH4 AND MBH4 METAL HYDRIDES FOR REVERSIBLE HYDROGEN STORAGE

(75) Inventors: Bouziane Yebka, Warren, MI (US); Gholam-Abbas Nazri, Bloomfield Hills, MI (US)

(73) Assignee: General Motors Corporation, Detroit, MI (US)

( * ) Notice: Subject to any disclaimer, the term of this patent is extended or adjusted under 35 U.S.C. 154(b) by 91 days.

(21) Appl. No.: 09/997,127

(22) Filed: Nov. 29, 2001

(65) Prior Publication Data

US 2003/0099595 A1 May 29, 2003

(51) Int. Cl.[7] .............................. C01B 3/04; C01B 6/24
(52) U.S. Cl. .................. 423/648.1; 423/644; 423/658.2
(58) Field of Search ........................ 423/648.1, 658.2, 423/644

(56) References Cited

U.S. PATENT DOCUMENTS

| | | | |
|---|---|---|---|
| 4,528,176 A | 7/1985 | Nelson | 423/644 |
| 4,529,580 A | 7/1985 | Nelson | 423/644 |
| 4,563,343 A | 1/1986 | Nelson | 423/644 |
| 5,882,623 A * | 3/1999 | Zaluska et al. | 423/658.2 |
| 6,106,801 A * | 8/2000 | Bogdanovic et al. | 423/658.2 |
| 6,251,349 B1 * | 6/2001 | Zaluska et al. | 423/658.2 |
| 6,342,198 B1 * | 1/2002 | Zaluska et al. | 423/658.2 |
| 6,514,478 B2 * | 2/2003 | Zaluska et al. | 423/658.2 |

OTHER PUBLICATIONS

Patent Application Publication US 2002/0141939A1 (Schulz et al), Oct. 3, 2002.*

* cited by examiner

Primary Examiner—Wayne A. Langel
(74) Attorney, Agent, or Firm—Kathryn A. Marra

(57) ABSTRACT

A process for enhancing the kinetics of hydrogenation/ dehydrogenation of complex chemical hydrides using mechanomixing and/or mechanomilling. The mechanomixing makes hydrogenation/dehydrogenation of complex chemical hydrides reversible at much reduced temperature and pressure. The mechanomilling reduces particle size or grain size of the decomposition byproducts, further increasing surface area and intimate contact of the byproducts. In the process of the present invention, complex chemical hydrides can be utilized as a reversible hydrogen storage media for various applications such as transportation, including fuel cells. The process is simple and inexpensive.

23 Claims, 3 Drawing Sheets

US 6,680,043 B2

PROCESS FOR ENHANCING THE KINETICS OF HYDROGENATION/DEHYDROGENATION OF MAlH4 AND MBH4 METAL HYDRIDES FOR REVERSIBLE HYDROGEN STORAGE

TECHNICAL FIELD

This invention relates to a process for enhancing the kinetics of hydrogenation/dehydrogenation of $MAlH_4$ and $MBH_4$ metal hydrides, and more particularly to such a process using mechanomixing for low temperature, low-pressure reversible hydrogen storage.

BACKGROUND OF THE INVENTION

Application of hydrogen as a fuel is attractive because it generates no polluting emissions. However, this attractive application has been hindered due to volumetric problems of storing hydrogen in gaseous or even liquid forms. Hydrogen storage alloys have been proposed and developed to the extent of commercial use in metal hydride batteries. However, the gravimetric hydrogen storage in alloys is still low and requires high pressure and temperature.

Complex chemical hydrides with hydrogen storage capacity have been proposed, and hydrogen generation from this class of compounds has been demonstrated. Unfortunately, hydrogenation of the decomposed complex chemical hydrides is not straightforward, and remains a scientific challenge.

It has been demonstrated that the decomposition of $NaAlH_4$ occurs with at least distinct thermal signatures. The decomposition byproducts have been proposed and identified in the past. The decomposition steps of $NaAlH_4$ can be summarized as follows:

$$3NaAlH_{4(solid)} \rightarrow Na_3AlH_{6(solid)} + Al + 3H_2 \quad (Eq.\ 1)$$

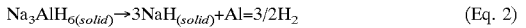

$$Na_3AlH_{6(solid)} \rightarrow 3NaH_{(solid)} + Al = 3/2 H_2 \quad (Eq.\ 2)$$

$$NaH_{(solid)} \rightarrow Na + 1/2 H_2 \quad (Eq.\ 3)$$

Several research groups have investigated the use of catalysts to enhance hydrogenation of complex chemical hydrides. Although some successes have been achieved, the kinetics and reversible hydrogen capacity of these materials remains very low. In particular, the hydrogen capacity of the materials decays very fast during hydrogenation/dehydrogenation cycles.

Bagdanovic (German patent No. 195-26-434, 1995) describes the catalytic effects of transition metal doping of kinetics and reversibility age of a series of alanates. This reference suggests that $NaAlH_4$ doped with titanium decomposes at a reduced temperature and pressure. Further, it is suggested that the reversibility of the compound is also improved by the titanium doping. Others have also observed the catalytic effects of titanium and zirconium doping.

Zaluski et al, J Alloys Compd. 285, 125 (2000), have reported the kinetics enhancement of $NaAlH_4$ by energetic milling of alanate with carbon. Carbon was mixed with the $NaAlH_4$ and milled prior to any hydrogenation/dehydrogenation. No mixing or milling was conducted during the hydrogenation or dehydrogenation. However, it is also reported that the large amount of carbon may have a negative effect as it reduces the gravimetric percentage of active alanates in the composite. It is believed that the carbon actually poisons the process.

Thus, it would be desirable to provide a process for the reversible hydrogenation/dehydrogenation of metal hydrides that overcomes the problems associated with prior art methods.

SUMMARY OF THE INVENTION

The invention includes a process for enhancing the kinetics of hydrogenation/dehydrogenation of complex chemical hydrides using mechanomixing and/or mechanomilling. The mechanomixing makes hydrogenation/dehydrogenation of complex chemical hydrides reversible at much reduced temperatures and pressures. The mechanomilling reduces particle size or grain size of the decomposition byproducts, further increasing surface area and intimate contact of the byproducts. In the process of the present invention, complex chemical hydrides can be utilized as a reversible hydrogen storage media for various applications such as transportation, including fuel cells. The process is simple and inexpensive.

The process according to the present invention utilizes complex chemical hydrides of a variety of different formulas, and most preferably complex chemical hydrides generally having the formula $MBH_4$ where M is at least one selected from the group consisting of Na, Li and K, and where B is at least one selected from the group consisting of the elements in the third column of the periodic table. The invention can be practiced using various mixing and/or milling techniques known to those skilled in the art. The invention can be practiced with real-time mixing during decomposition. Wet milling of the decomposition products is also contemplated as producing similar results. Mixing and/or milling methods other than mechanical are also contemplated useful in the present invention.

The invention includes a process for the dehydrogenation/hydrogenation of a complex chemical hydride comprising: decomposing a complex chemical hydride to produce hydrogen and a plurality of byproducts, and whereby the decomposing of the complex chemical hydride produces a foamy mass; mixing the foamy mass to bring the byproducts in more intimate contact with each other and to produce a mixed byproduct mass of reduced volume; and exposing the mixed byproduct mass of reduced volume to hydrogen so that the hydrogen reacts with the byproducts to produce a complex chemical hydride having greater hydrogen content than the byproducts.

In another embodiment of the invention, the complex chemical hydride includes material having the formula $MBH_4$ where M is at least one selected from the group consisting of Na, Li and K, and where B is at least one selected from the group consisting of the elements in the third column of periodic table.

In another embodiment of the invention, the complex chemical hydride includes material having the formula $MBH_4$ where M includes Na and B includes Al.

In another embodiment of the invention, the mixing of the foamy mass includes moving a metal ball through the foamy mass.

In another embodiment of the invention, the mixing of the foamy mass includes stirring the foamy mass with a stirring rod.

In another embodiment of the invention, the decomposing of the complex chemical hydride comprises heating the complex chemical hydride to a temperature ranging from 50° C. to 600° C.

In another embodiment of the invention, the decomposing of the complex chemical hydride comprises heating the complex chemical hydride to a temperature ranging from about 100° C. to 200° C. to produce a first set of the byproducts, and thereafter heating the complex chemical hydride to a temperature ranging from greater than 200° C. to 300° C. to produce a second set of the byproducts.

In another embodiment of the invention, the decomposing of the complex chemical hydride comprises heating the complex chemical hydride to a temperature ranging from 100° C. to 300° C.

Another embodiment of the invention includes a process for the dehydrogenation/hydrogenation of a complex chemical hydride comprising: decomposing a complex chemical hydride to produce hydrogen and a plurality of byproducts, and whereby the decomposing of the complex chemical hydride produces a foamy mass, and wherein the complex chemical hydride comprises $NaAlH_4$; mixing the foamy mass to bring the byproducts in more intimate contact with each other and to produce a mixed byproduct mass of reduced volume; and exposing the mixed byproduct mass of reduced volume to hydrogen so that the hydrogen reacts with the byproducts to produce a complex chemical hydride having greater hydrogen content than the byproducts.

Another embodiment of the invention includes a process for the dehydrogenation/hydrogenation of a complex chemical hydride comprising: decomposing a complex chemical hydride to produce hydrogen and a plurality of byproducts, and whereby the decomposing of the complex chemical hydride produces a foamy mass, and without mixing the complex chemical hydride during the decomposing of the complex chemical hydride; mixing the foamy mass to bring the byproducts in more intimate contact with each other and to produce a mixed byproduct mass of reduced volume; and exposing the mixed byproduct mass of reduced volume to hydrogen so that the hydrogen reacts with the byproducts to produce a complex chemical hydride having greater hydrogen content than the byproducts.

Another embodiment of the invention includes a process for the dehydrogenation/hydrogenation of a complex chemical hydride comprising: decomposing a complex chemical hydride to produce hydrogen and a plurality of byproducts, and whereby the decomposing of the complex chemical hydride produces a foamy mass, and mixing the complex chemical hydride during the decomposing of the complex chemical hydride; mixing the foamy mass to bring the byproducts in more intimate contact with each other and to produce a mixed byproduct mass of reduced volume; and exposing the mixed byproduct mass of reduced volume to hydrogen so that the hydrogen reacts with the byproducts to produce a complex chemical hydride having greater hydrogen content than the byproducts.

Another embodiment of the invention includes a process for the dehydrogenation/hydrogenation of a complex chemical hydride comprising: decomposing a complex chemical hydride to produce hydrogen and a plurality of byproducts, and whereby the decomposing of the complex chemical hydride produces a foamy mass; mixing the foamy mass to bring the byproducts in more intimate contact with each other and to produce a mixed byproduct mass of reduced volume; and exposing the mixed byproduct mass of reduced volume to hydrogen at a pressure less than 400 pounds per square inch so that the hydrogen reacts with the byproducts to produce a complex chemical hydride having greater hydrogen content than the byproducts.

These and other objects, features and advantages of the present invention will become apparent from the following brief description of the drawings, detailed description of the preferred embodiments, and appended claims and drawings.

DESCRIPTION OF THE PREFERRED EMBODIMENT

Figure 1:
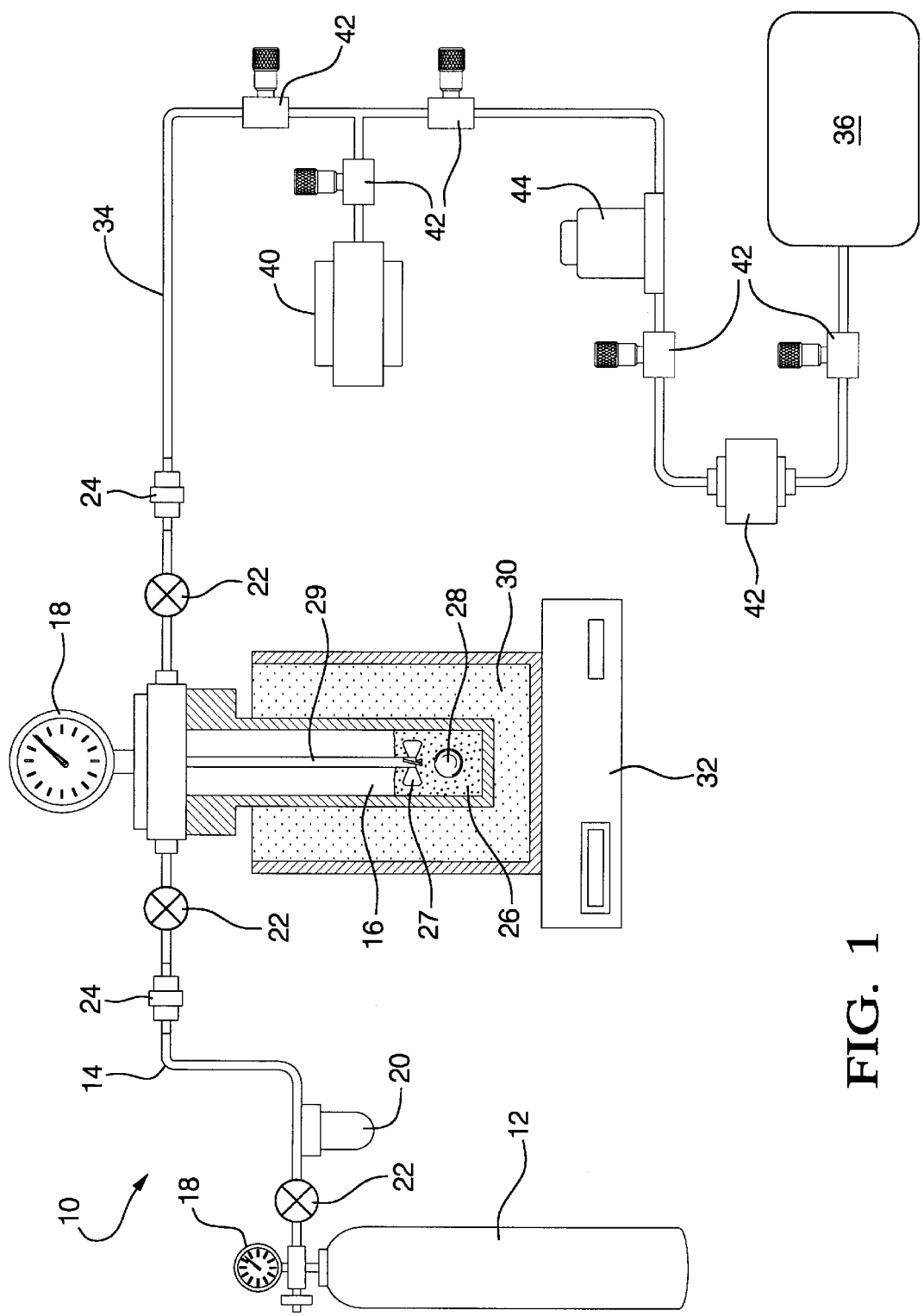
FIG. 1 is a schematic illustration of a system useful in practicing the process according to the present intention.

FIG. 1 is a schematic illustration of a system 10 useful in practicing a process according to the present invention. The system 10 includes a hydrogen source 12 which may be a pressure vessel having hydrogen under pressure contained therein or may be another source type for hydrogen such as a fuel reformation system for reforming a fuel such as methanol or gasoline to produce hydrogen. Plumbing 14 may be provided from the hydrogen source 12 to a hydrogenation/dehydrogenation reaction vessel 16. Pressure gauges 18, filters 20, valves 22, and quick connects 24 may be provided in the plumbing 14 between the hydrogen source 12 and the reaction vessel 16 as desired. The reaction vessel 16 receives a complex chemical hydride such as a hydride having the formula $MBH_4$ where M is at least one selected from the group consisting of Na, Li and K, and where B is at least one selected from the group consisting of the elements in the third column of the periodic table (B, Al, Ga, In, Tl, Sc, Y, La, Ac). The complex chemical hydride is preferably in a solid phase, but may be wet or in a liquid phase. The reaction vessel 16 is constructed and arrange to receive one or more mixing and/or milling devices 28, 29. A mixing device 28 may include a stainless-steel ball(s) which may be caused to move around in the vessel by mechanical means such as by rotating a stirring rod 29 with a paddle 27 on the end thereof. A motor (not shown) may be provided to rotate the stirring rod 29. Alternatively, the reaction vessel 16 may be removed by from the setup and vibrated with the steel ball 28 therein to mix the complex chemical hydrides during and/or after the decomposition process. The system includes a heating element 30 such as a tube furnace to supply heat to the complex chemical hydride to decomposes the same. A controller 32 is provided to monitor and control the heat applied to the complex chemical hydride by the tube furnace 30. Plumbing 34 may be provided between the reaction vessel 16 and a hydrogen measuring device 36 such as a syringe, or a hydrogen application device, such as a fuel cell. Vacuum pumps 40, needle valves 42, mass flow meters 44, and sensors 46 may be provided in the plumbing 34 between the reaction vessel 16 and the measuring device 36 or hydrogen application device as desired. The above-described system was used to conduct and verify the reversibility of a hydrogenation/dehydrogenation process according to the present invention.

Sodium aluminum hydride was purified by re-crystallizing commercial $NaAlH_4$. A 1.0M solution of $NaAlH_4$ in THF (tetrahydrofuran) was prepared using the Shlenk method. In a typical experiment, 10 g of $NaAlH_4$ in 100 ml of THF was stirred for one hour and filtered through a glass filter. The filtrate was concentrated to about 30 ml in vacuum, whereby $NaAlH_4$ started to separate from the solution. 100 ml Pentane was added to the THF solution and the mixture was stirred for three hours under an argon atmosphere causing $NaAlH_4$ to fully separate from the solution as a fine precipitate. The suspension was stirred for two more hours, filtered, and the remaining THF was removed by washing thrice with pentane/toluene. Then, the solid sample was filtered and dried under vacuum overnight at room temperature. After drying, $NaAlH_4$ was obtained as a fine white powder. Lithium aluminum hydride was prepared by using the same process from a commercial 1.0 M solution of $LiAlH_4$ in tetrahydrofuran. After drying, $LiAlH_4$ was obtained as a fine white powder.

The mechanomixing process has been applied at the end of each dehydrogenation process. The mechanomixing process has improved the kinetics of hydrogenation process due to: (1) intimate contact of the decomposition byproducts, which is essential for hydrogenation to take place, and (2) activation of the byproducts due to generation of defects and non-stoichiometric surface composition. In addition to the intimate mixing, the destabilization of the bulk by surface activation is also required for enhanced hydrogenation. The following examples provide detailed information about hydrogenation/dehydrogenation of $NaAlH_4$ according to the present invention.

EXAMPLE 1

Figure 2:
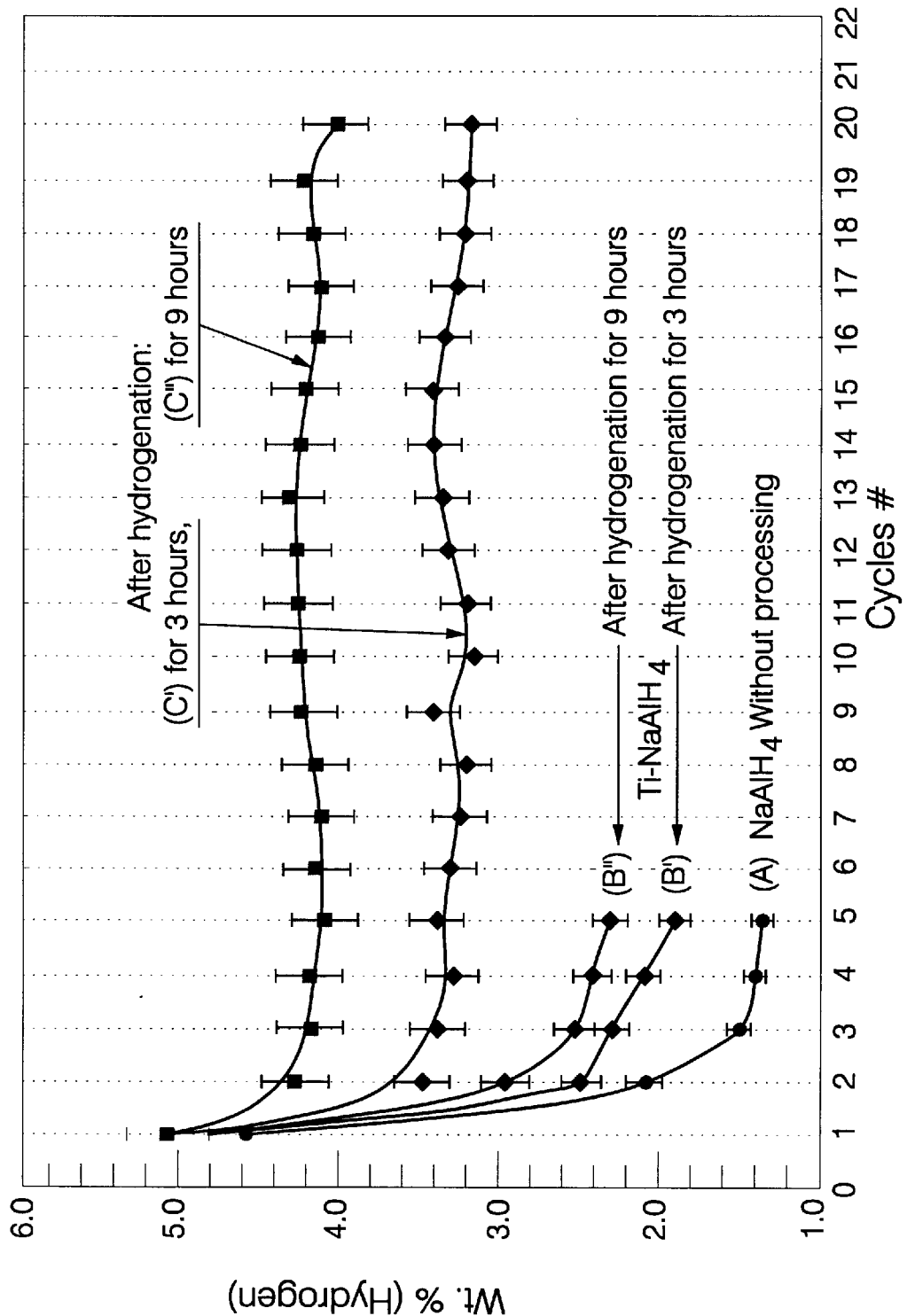
FIG. 2 is a graphical illustration of the reversible hydrogenation/dehydrogenation of a complex metal hydride and the influence of mechanomixing at the end of each dehydrogenation to process according the present invention.

One gram of purified $NaAlH_4$ was placed in a stainless steel reaction vessel and heat treated up to 300° C. The volume of the generated hydrogen was measured using a simple inverted graduated cylinder 36 as shown in FIG. 1. The decomposed byproducts were milled using steel balls (in the vessel) that were moved by vibrating the vessel for 10 minutes. The pressure of hydrogen was adjusted to 100 bar hydrogen at 160° C. isotherm for a period of 3 to 9 hours. The hydrogen pressure was released to ambient pressure, and the sample was heated to 300° C. and released hydrogen was measured again. This cycle was repeated at least 20 times. The amount of hydrogen generated in each cycle is shown in FIG. 2.

EXAMPLE 2

Figure 3A:
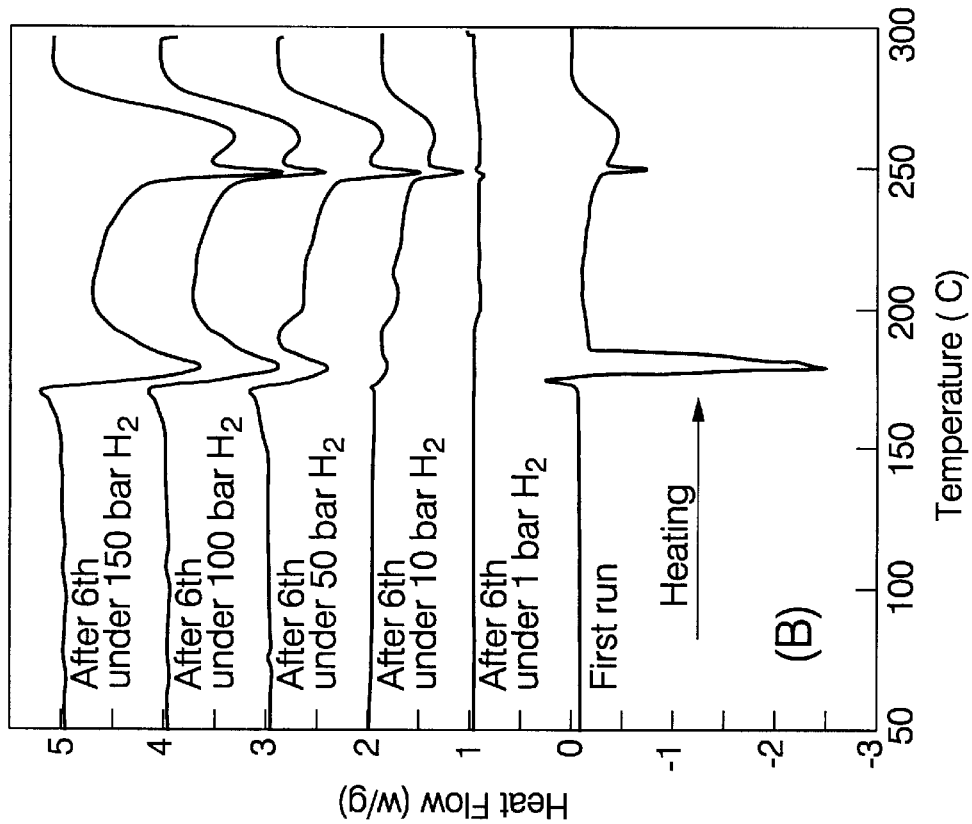
FIG. 3A is a graphic representation of the differential scanning calorimetry of a Ti doped complex chemical hydride.
Figure 3B:
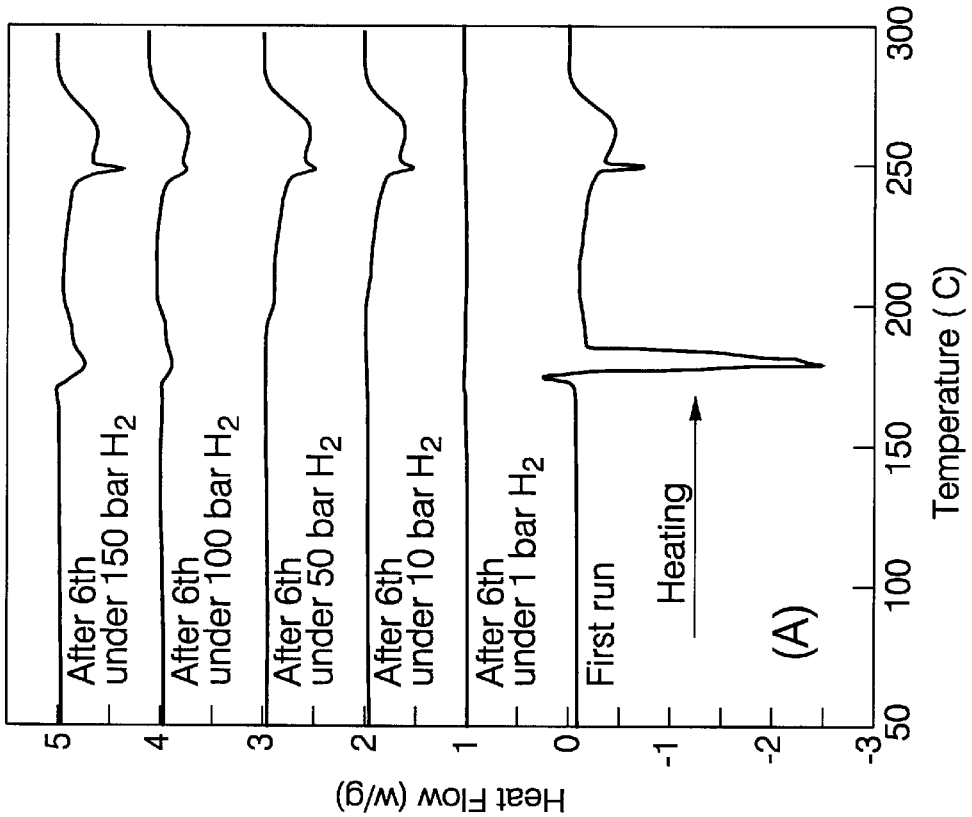
FIG. 3B is a graphic representation of the differential scanning calorimetry of a complex chemical hydride processed according to the present invention.

In order to compare the effectiveness of the mechanomixing as compared to that of catalytic effects, the $NaAlH_4$ was catalyzed by Ti according to the following procedure. The $NaAlH_4$ was doped with Ti catalyst at 2 mole % level. Hydrogenation/dehydrogenation cycles similar to experiment 1 was performed. In order to see the effect of one variable on the properties, the time was kept constant (6 hours). The same powder was used while hydrogen pressure was changed. FIGS. 3A–3B shows the effect of Ti doping on hydrogenation/dehydrogenation cycles. As shown in FIG. 2, mechanical mixing resulted in a uniform dispersion of particles and provides a more enhanced kinetics for hydrogenation/dehydrogenation cycles. We have noticed by microscopy observation that a more compact mixture (reduced volume) was observed after mechanomixing, resulting in better hydrogenation kinetics. It is noteworthy to mention that $NaAlH_4$ is formed not only from $Na_3AlH_6$ particles ($Na_3AlH_6 + 2Al + 3H_2 \rightarrow 3NaAlH_4$) but also from NaH and Al particles ($3NaH + 3Al + H_2 \rightarrow 3NaAlH_4$).

This invention has shown that mechanical mixing is an effective process for producing a uniform mixture of byproduct particles. The mixed byproduct shows the best cycle life with the first hydrogen capacity (>4 wt. %). It maintains 82% of the first cycle discharge capacity even after 20 cycles (FIG. 2). From x-ray analysis, it is found that the $NaAlH_4$ is the main product after each hydrogenation process.

The advantage of mechanical mixing during and/or after decomposition over other techniques becomes more apparent as the decomposed byproducts remain in intimate contact and also at much smaller particle size. The smaller particle size provides higher surface area for hydrogenation reaction, and the molecular level mixing of the components is essential to achieve fast kinetics.

As a sample of the complex chemical hydride decomposes upon the application of heat, the sample becomes foamy or frothy as a result of the byproducts produced (which includes hydrogen gas) in the decomposition process. Mixing and/or milling the sample brings the byproducts into intimate contact with each other. Furthermore, mixing and/or milling inhibits grain growth of the byproducts or reduces the particle size or grain growth of the byproducts so that a more reactive byproduct will be present for the hydrogenation step. The mixing and/or milling reduces the foamy or frothy nature of the sample. The process can be accomplished at a low pressure ranging from atmosphere to 400 pounds per square inch or less, and at a temperature ranging from about 100° C. to 600° C., and preferably from about 160° C. to 300° C.

The terms "mixing" or "mechanomixing" as used herein mean blending so that the constituent parts are intermingled to provide a more homogeneous mixture. The terms "milling" or "mechanomilling" as used herein mean grinding to reduce the particle or grain size of the constituent parts.

As will be appreciated from FIG. 2, the repeatability of the hydrogenation of the non-catalyzed complex chemical hydride without mixing (line A), or with a catalyzed complex chemical hydride without mixing (line B' after three hours of hydrogenation or line B" after nine hours of hydrogenation) dramatically drops off only after a few hydrogenation/dehydrogenation cycles. In contrast, using the complex chemical hydride in a process including mixing and/or milling according to the present invention produces repeatable, reliable, and consistent hydrogenation after numerous hydrogenation/dehydrogenation cycles (line C' after hydrogenation for three hours and line C" after hydrogenation for nine hours).

As will be appreciated from a comparison of FIGS. 3A and 3B, even the addition of the catalyst such as Ti to a complex chemical hydride such as $NaAlH_4$ does not produce as good as results as does mixing the complex chemical hydride sample after decomposition (FIG. 3B). FIG. 3B shows that a substantially greater amount of $NaAlH_4$ is been formed at much lower pressures in a process according to the present invention that mixes complex chemical hydride after the decomposition step compared to the catalyzed complex chemical hydride without mixing.

What is claimed is:

1. A process for the dehydrogenation/hydrogenation of a complex chemical hydride comprising:
   decomposing a complex chemical hydride to produce hydrogen and a plurality of byproducts, and whereby the decomposing of the complex chemical hydride produces a foamy mass;
   mixing the foamy mass to bring the byproducts in more intimate contact with each other and to produce a mixed byproduct mass of reduced volume; and
   exposing the mixed byproduct mass of reduced volume to hydrogen so that the hydrogen reacts with the byproducts to produce a complex chemical hydride having greater hydrogen content than the byproducts.

2. A process as set forth in claim 1 wherein the complex chemical hydride includes a material having the formula $MBH_4$ where M is at least one selected from the group consisting of Na, Li and K, and where B is at least one selected from the group consisting of the elements in the third column of periodic table.

3. A process as set forth in claim 1 wherein the complex chemical hydride includes a material having the formula $MBH_4$ where M includes Na and B includes Al.

4. A process as set forth in claim 1 wherein the mixing of the foamy mass includes moving a metal ball through the foamy mass.

5. A process as set forth in claim 1 wherein the mixing the foamy mass includes stirring the foamy mass with a stirring rod.

6. A process as set forth in claim 1 wherein the decomposing of the complex chemical hydride comprises heating the complex chemical hydride to a temperature ranging from 50° C. to 600° C.

7. A process as set forth in claim 1 wherein the decomposing of the complex chemical hydride comprises heating the complex chemical hydride to a temperature ranging from about 100° C. to 200° C. to produce a first set of the byproducts, and thereafter heating the complex chemical hydride to a temperature ranging from greater than 200° C. to 300° C. to produce a second set of the byproducts.

8. A process as set forth in claim 1 wherein the decomposing of the complex chemical hydride comprises heating the complex chemical hydride to a temperature ranging from 100° C. to 300° C.

9. A process for the dehydrogenation/hydrogenation of a complex chemical hydride comprising:
  decomposing a complex chemical hydride to produce hydrogen and a plurality of byproducts, and whereby the decomposing of the complex chemical hydride produces a foamy mass, and wherein the complex chemical hydride comprises $NaAlH_4$;
  mixing the foamy mass to bring the byproducts in more intimate contact with each other and to produce a mixed byproduct mass of reduced volume; and
  exposing the mixed byproduct mass of reduced volume to hydrogen so that the hydrogen reacts with the byproducts to produce a complex chemical hydride having greater hydrogen content than the byproducts.

10. A process as set forth in claim 9 wherein the mixing of the foamy mass includes moving a metal ball through the foamy mass.

11. A process as set forth in claim 9 wherein the mixing the foamy mass includes stirring the foamy mass with a stirring rod.

12. A process as set forth in claim 9 wherein the decomposing of the complex chemical hydride comprises heating the complex chemical hydride to a temperature ranging from 50° C. to 600° C.

13. A process as set forth in claim 9 wherein the decomposing of the complex chemical hydride comprises heating the complex chemical hydride to a temperature ranging from about 100° C. to 200° C. to produce a first set of the byproducts, and after heating the complex chemical hydride to a temperature ranging from greater than 200° C. to 300° C. to produce a second set of the byproducts.

14. A process as set forth in claim 9 wherein the decomposing of the complex chemical hydride comprises heating the complex chemical hydride to a temperature ranging from 100° C. to 300° C.

15. A process for the dehydrogenation/hydrogenation of a complex chemical hydride comprising:
  decomposing a complex chemical hydride to produce hydrogen and a plurality of byproducts, and whereby the decomposing of the complex chemical hydride produces a foamy mass, and without mixing the complex chemical hydride during the decomposing of the complex chemical hydride;
  mixing the foamy mass to bring the byproducts in more intimate contact with each other and to produce a mixed byproduct mass of reduced volume; and
  exposing the mixed byproduct mass of reduced volume to hydrogen so that the hydrogen reacts with the byproducts to produce a complex chemical hydride having greater hydrogen content than the byproducts.

16. A process for the dehydrogenation/hydrogenation of a complex chemical hydride comprising:
  decomposing a complex chemical hydride to produce hydrogen and a plurality of byproducts, and whereby the decomposing of the complex chemical hydride produces a foamy mass, and mixing the complex chemical hydride during the decomposing of the complex chemical hydride;
  mixing the foamy mass to bring the byproducts in more intimate contact with each other and to produce a mixed byproduct mass of reduced volume; and
  exposing the mixed byproduct mass of reduced volume to hydrogen so that the hydrogen reacts with the byproducts to produce a complex chemical hydride having greater hydrogen content than the byproducts.

17. A process for the dehydrogenation/hydrogenation of a complex chemical hydride comprising:
  decomposing a complex chemical hydride to produce hydrogen and a plurality of byproducts, and whereby the decomposing of the complex chemical hydride produces a foamy mass;
  mixing the foamy mass to bring the byproducts in more intimate contact with each other and to produce a mixed byproduct mass of reduced volume; and
  exposing the mixed byproduct mass of reduced volume to hydrogen at a pressure less than 400 pound per square inch so that the hydrogen reacts with the byproducts to produce a complex chemical hydride having greater hydrogen content than the byproducts.

18. A process as set forth in claim 17 wherein the decomposing of the complex chemical hydride comprises heating the complex chemical hydride to a temperature ranging from 50° C. to 600° C.

19. A process as set forth in claim 17 wherein the decomposing of the complex chemical hydride comprises heating the complex chemical hydride to a temperature ranging from about 100° C. to 200° C. to produce a first set of the byproducts, and thereafter heating the complex chemical hydride to a temperature ranging from greater than 200° C. to 300° C. to produce a second set of the byproducts.

20. A process as set forth in claim 17 wherein the decomposing of the complex chemical hydride comprises heating the complex chemical hydride to a temperature ranging from 100° C. to 300° C.

21. A process for the dehydrogenation/hydrogenation of a complex chemical hydride comprising:
  decomposing a complex chemical hydride to produce hydrogen and a plurality of byproducts;
  mixing the byproducts to bring the byproducts in more intimate contact with each other and to produce a mixed byproduct mass; and
  exposing the mixed byproduct mass to hydrogen so that the hydrogen reacts with the byproducts to produce a complex chemical hydride having greater hydrogen content than the byproducts.

22. A process for the dehydrogenation/hydrogenation of a non-catalyzed complex chemical hydride comprising:

decomposing a non-catalyzed complex chemical hydride to produce hydrogen and a plurality of byproducts;

mixing the byproducts to bring the byproducts in more intimate contact with each other and to produce a mixed byproduct mass; and exposing the mixed byproduct mass to hydrogen so that the hydrogen reacts with the byproducts to produce a complex chemical hydride having greater hydrogen content than the byproducts.

23. A process of dehydrogenation/hydrogenation of a non-catalyzed complex chemical hydride comprising:

decomposing a non-catalyzed complex chemical hydride to produce hydrogen and a plurality of byproducts;

milling the byproducts to reduce the particle and grain size of the byproducts and bring the byproducts in more intimate contact with each other and to produce a mixed byproduct mass; and exposing the mixed byproduct mass to hydrogen so that the hydrogen reacts with the byproducts to produce a complex chemical hydride having greater hydrogen content than the byproducts.

* * * * *